United States Patent
Chertkow et al.

(10) Patent No.: US 7,041,042 B2
(45) Date of Patent: May 9, 2006

(54) METHOD FOR MAKING A SEAMLESS PLASTIC MOTION DISCOMFORT RECEPTACLE

(75) Inventors: Louis Chertkow, Beverly Hills, CA (US); Pam Pananon, Covina, CA (US)

(73) Assignee: Elkay Plastics Company, Inc., Los Angeles, CA (US)

( * ) Notice: Subject to any disclaimer, the term of this patent is extended or adjusted under 35 U.S.C. 154(b) by 172 days.

(21) Appl. No.: 10/423,427

(22) Filed: Apr. 25, 2003

(65) Prior Publication Data

US 2004/0213483 A1    Oct. 28, 2004

(51) Int. Cl.
*B31B 1/88* (2006.01)
(52) U.S. Cl. .................. 493/187; 493/211; 493/214
(58) Field of Classification Search ............ 383/88, 383/120, 104, 109, 123–124; 493/210, 211, 493/293, 33, 214, 187
See application file for complete search history.

(56) References Cited

U.S. PATENT DOCUMENTS

| | | | | | |
|---|---|---|---|---|---|
| 2,648,263 | A | * | 8/1953 | Richens | 493/205 |
| 2,943,660 | A | * | 7/1960 | Seeger | 383/13 |
| 3,149,771 | A | * | 9/1964 | Pearl | 383/89 |
| 3,575,225 | A | * | 4/1971 | Muheim | 383/206 |
| 3,920,179 | A | * | 11/1975 | Hall | 604/317 |
| 4,328,895 | A | * | 5/1982 | Jaeger | 206/496 |
| 4,501,780 | A | * | 2/1985 | Walters et al. | 428/34.9 |
| 5,788,378 | A | * | 8/1998 | Thomas | 383/63 |
| 5,887,942 | A | * | 3/1999 | Allegro, Jr. | 297/188.12 |

OTHER PUBLICATIONS

AMI Supplies Inc. specimen dated Sep. 20, 2002 latest labeled "For Motion Discomfort".

* cited by examiner

*Primary Examiner*—Jes F. Pascua
(74) *Attorney, Agent, or Firm*—Fulwider Patton LLP

(57) ABSTRACT

A plastic motion sickness receptacle is disclosed having a seamless perimeter defined by a tubular member folded at a first closed end, and an open end including means for closing the receptacle after use. The plastic tubular member comprises integrally formed walls that terminate in a base at said closed end with the edges of the walls cooperating to form a fluid-tight relationship. An outer surface of the receptacle includes indicia printed thereon including instructions for using the bag upon the occurrence of motion sickness.

1 Claim, 2 Drawing Sheets

US 7,041,042 B2

METHOD FOR MAKING A SEAMLESS PLASTIC MOTION DISCOMFORT RECEPTACLE

BACKGROUND OF THE INVENTION

1. Field of the Invention

The present invention relates generally to travel accommodations, and more particularly to a travel sickness receptacle of seamless construction formed of plastic to resist leakage and seepage.

2. Description of Related Art

Many people are afflicted with a temporary malady that is brought upon by uneven motion, commonly known as motion sickness. While motion sickness can be brought about by many types of motion it is especially common in airplanes and ships. Motion sickness results for many people when they experience accelerations in multiple directions as one might encounter in a plane or rolling ship, and can be made worse if the individual cannot view the horizon for reference. The balance function of the inner ear under these conditions can send conflicting messages to the brain in comparison with visual signals of the interior of a plane's or ship's travel compartment. That is, the visual surrounding that the individual perceives may not coincide with the rocking and rolling motion the individual perceives through its balancing center at the inner ear. This conflict can lead to the traditional symptoms of dizziness, fatigue, sweating, and nausea which may progress to vomiting.

As much as one third to one half of airline passengers experience motion sickness under conditions of heavy turbulence, and one would expect similar ratios for inclement sea travel as well. Because heavy air turbulence and high seas are a regular feature of airline and ship travel, virtually every commercial airplane and passenger ship is equipped with receptacles commonly referred to as motion sickness bags. These paper bags are provided to passengers so that, upon the onset of nausea, the passengers may have some place to evacuate their stomach contents should the nausea progress to vomiting. These paper bags are typically located in seat pockets and can be used while the passengers are in their seat-belted positions one would expect during heavy turbulence. The bags can be very reassuring to the passengers, knowing that if the passenger should become ill, a potentially embarrassing situation can be avoided by discretely using the motion sickness bag without having to stand-up and walk to a restroom, which could exacerbate the condition.

While motion sickness bags satisfy an obvious need in the travel industry, their design has remained unchanged for the better part of fifty years or so. The bags are constructed of a folded heavy paper and may be lined on its interior with some finish to resist leakage or seepage of its contents. However, paper bags are formed from a flat sheet and comprise longitudinal creases or seams that can permit fluid to eventually leak and seep into the crevasses and create problems such as staining and emit odors. The containment of odors is especially important, since there are those that are moved to motion sickness by the odor of another's sickness. This can lead to a chain reaction that is unfortunately very common in severe travel conditions. And as with the smell of another's sickness, motion sickness can be accelerated or brought on by the sound of another traveler experience vomiting. Paper bags do little in the way of sound suppression to prevent others from perceiving a fellow travelers unpleasantness, often times leading to other passengers experiencing motion sickness.

SUMMARY OF THE INVENTION

The present invention overcomes the shortcomings of the prior art in providing a seamless motion sickness receptacle formed of a copolymer plastic material shaped without any longitudinal seams or crevasses through which fluids may seep or leak. The plastic receptacle is preferably extruded in its open configuration to provide a leak-proof vessel that is continuous and seamless circumferentially along its inner surface and is resilient to resist rupture after sealing in the event of pressure fluctuations. A first preferred embodiment comprises a receptacle made from a copolymer comprising ethylene and propylene that is heated to approximately 200° C. and then extruded into its final shape at a pressure of 450 Bar. The resultant receptacle is approximately four to five millimeters thick and is opaque, pliable, and resilient. Another consequence of using a thicker plastic material is that sound is suppressed to a greater extent, benefiting surrounding passengers who may become ill at the sound of another passenger's illness.

DETAILED DESCRIPTION OF THE PREFERRED EMBODIMENTS

Figure 1:
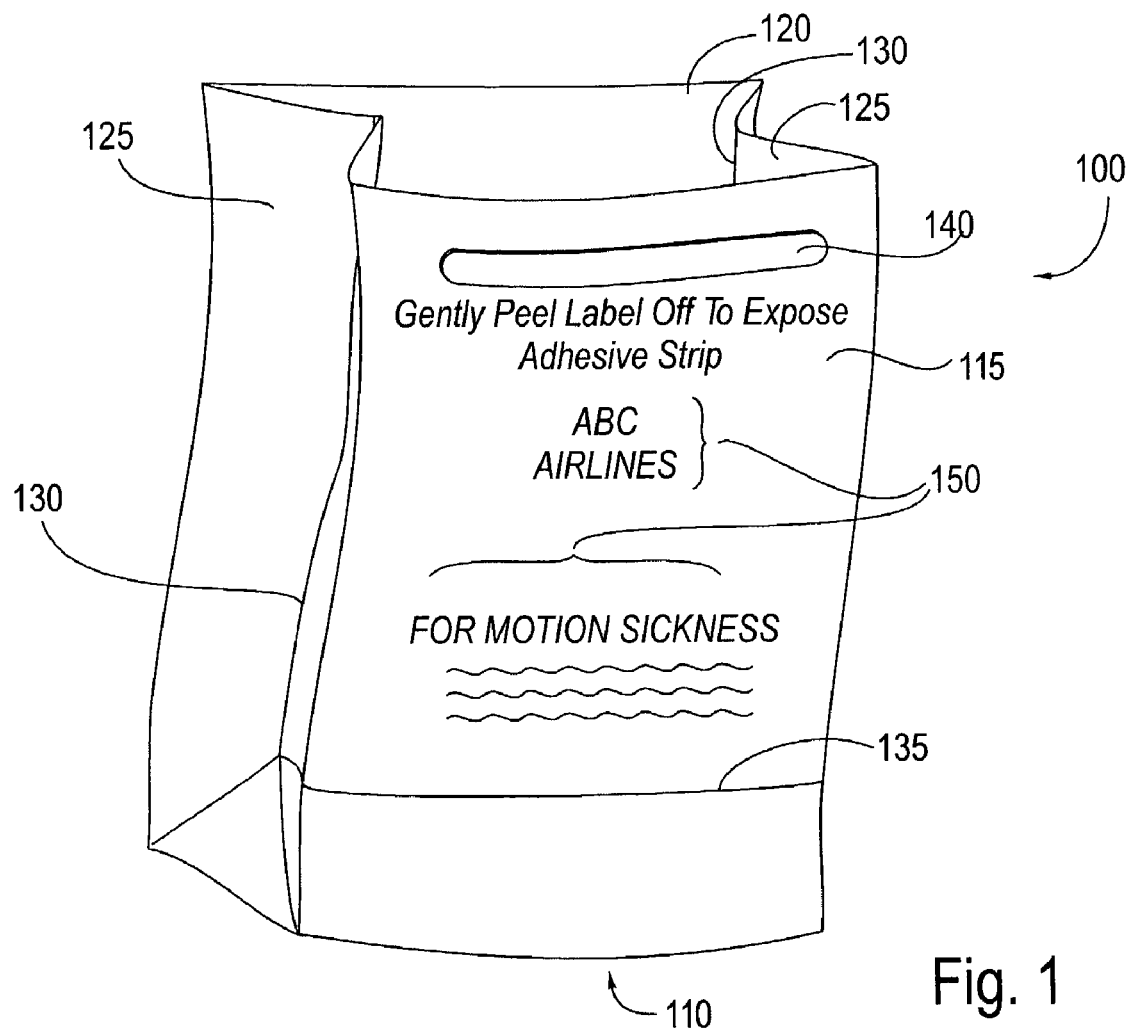
FIG. 1 is an elevated perspective view of a preferred embodiment of the present invention.

FIG. 1 illustrates a first preferred embodiment of a motion sickness receptacle 100 of the present invention having a generally open-ended columnar structure comprising a base 110, a front wall 115, a rear wall 120, and two side walls 125 with a crease 130 in the side walls 125 and a crease 135 in the front wall for collapsing the receptacle into a planar configuration prior to use. The four walls are integrally formed without a seam such that there is a continuous and uniform construction throughout and across the four walls. That is, the receptacle 100 is created as a tubular construction rather than a folded sheet, and thus there are no seams extending longitudinally along the receptacle's walls. Each wall is formed of a common uninterrupted thickness, and the thickness of the base 110 may preferably be consistent with the thickness of the four walls.

Closure means is preferably provided along an outer surface of at least one of the front and rear walls 115,120 along an upper edge. Closure means may comprise a twist-tie member (not shown) adhesively secured to the outer wall that allows the upper portion of the receptacle to be folded closed and secured using the flexible twist-tie member. Alternatively, an adhesive strip 140 may be included along the outer surface for securing a first folded edge of the receptacle 100 to an opposite folded edge in a closed and folded configuration thereby preventing the receptacle from unfolding and opening inadvertently. Other closure means exist in the art such as interlocking groove and tab members on the interior of opposing walls (such as those found on popular plastic sandwich bags), an envelope type overlapping adhesive configuration, and many others that may be employed without deviating from the scope of the present invention.

Figure 2:
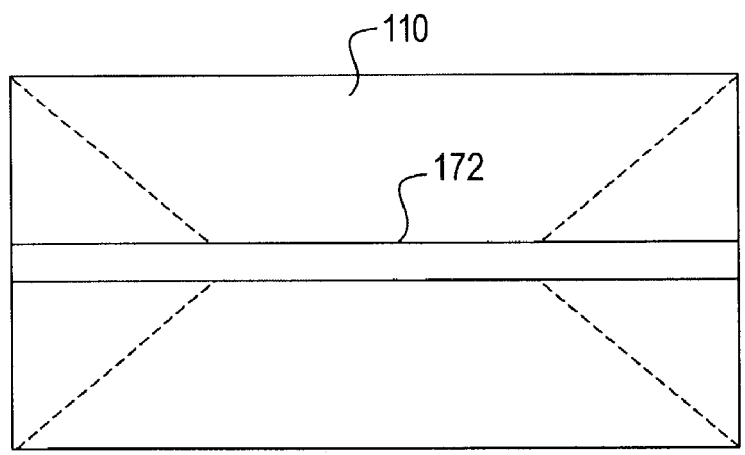
FIG. 2 is a bottom view of the embodiment of FIG. 1.

The receptacle 100 of the present invention preferably is formed of a copolymer material comprising ethylene and propylene. Pellets of the plastics are melted into a working composite mixture at about two hundred degrees Celsius, along with some additive agents for coloring purposes. This heated molten compound is placed in a die where an extrusion process forms an open-ended tubular receptacle as the compound flows into the gaps between the extruding member and the die. The extrusion process may take place at a controlled pressure of 450 Bar. This process creates an open-ended tubular member with a seamless perimeter that is not present in paper bags formed from flat sheets. After the extruded tubular member is formed, folds and creases that convert the tubular member into a rectangular shaped collapsible parallelepiped that folds into a flattened configuration are formed. This step is preferably done in an automated setting wherein a machine is utilized to create the folds and creases. The bottom of the receptacle (FIG. 2) is closed and sealed with a heat-press at an edge 172 of the tubular member to ensure that there can be no leakage through the bottom of the receptacle.

In the final step, the tubular member is subjected to a printing step in which printing 150 is applied on an outer surface or surfaces to include instructions on its use in the event of motion sickness, as well as possibly identifying the manufacture or the customer, present ordering information, or the like. The printing 150 is preferably carried out by a Gravure process whereby engraved plates or cylinders include an inverse image of the final indicia, and the plates or cylinders are inked and brought in contact with the outer surface of the tubular member to leave a remnant impression. This process permits high-speed printing of many units rapidly before each individual tubular member is formed into a receptacle.

The tubular member of the extruded copolymer plastic composition is formed into a bag-shaped receptacle by a sheet folding machine that folds a bottom end 110 of the tubular member into a closed configuration using either a heat-applying press or adhesively clamping the bottom edges of the plastic walls. The thus-closed end cooperates with the seamless integral wall configuration to prevent the contents of the receptacle from exiting through the junctures at the bottom and sides of the receptacle 100. The uninterrupted and uniform thickness of the walls 115, 120, 125 are approximately four to five millimeters thick, and this thickness provides adequate strength and coverage in the event of weak spots or unexpected thinning of the receptacle while preserving the flexibility and resiliency of the receptacle necessary to fold and stack the articles in confined spaces. The thicker, plastic walls and base 110 also suppress sound to a greater extent than the paper devices, thus aiding in minimizing the unpleasant and embarrassing nature one experiences socially when experiencing motion sickness.

The finished receptacle 100 is preferably four and one half to five inches tall and two and one half inches wide with a three inch bottom gusset in the open or inflated configuration. The tolerances on the thickness is approximately five percent. The receptacle can preferably be folded along vertical creases, and along traverse creases adjacent the base, to contract into a flat, compact pocket-size configuration prior to use. The resultant volume of the bag is more than adequate to accommodate the severest of motion sickness bouts.

In use, the motion sickness receptacle is removed from its storage location upon the initial onset of nausea and opened from its folded, compact configuration. Holding the receptacle to one's mouth, vomitus may be expelled into the receptacle discretely as sound is suppressed by the plastic material. Risk of leakage or seepage is effectively minimized or eliminated by the use of a seamless construction around the perimeter of the receptacle and the impervious character of the plastic material in comparison with the absorbent nature of paper products. After the receptacle has been used, a closure means as described above is implemented to close the contents therein until such time as the receptacle can be properly disposed.

Figure 3:
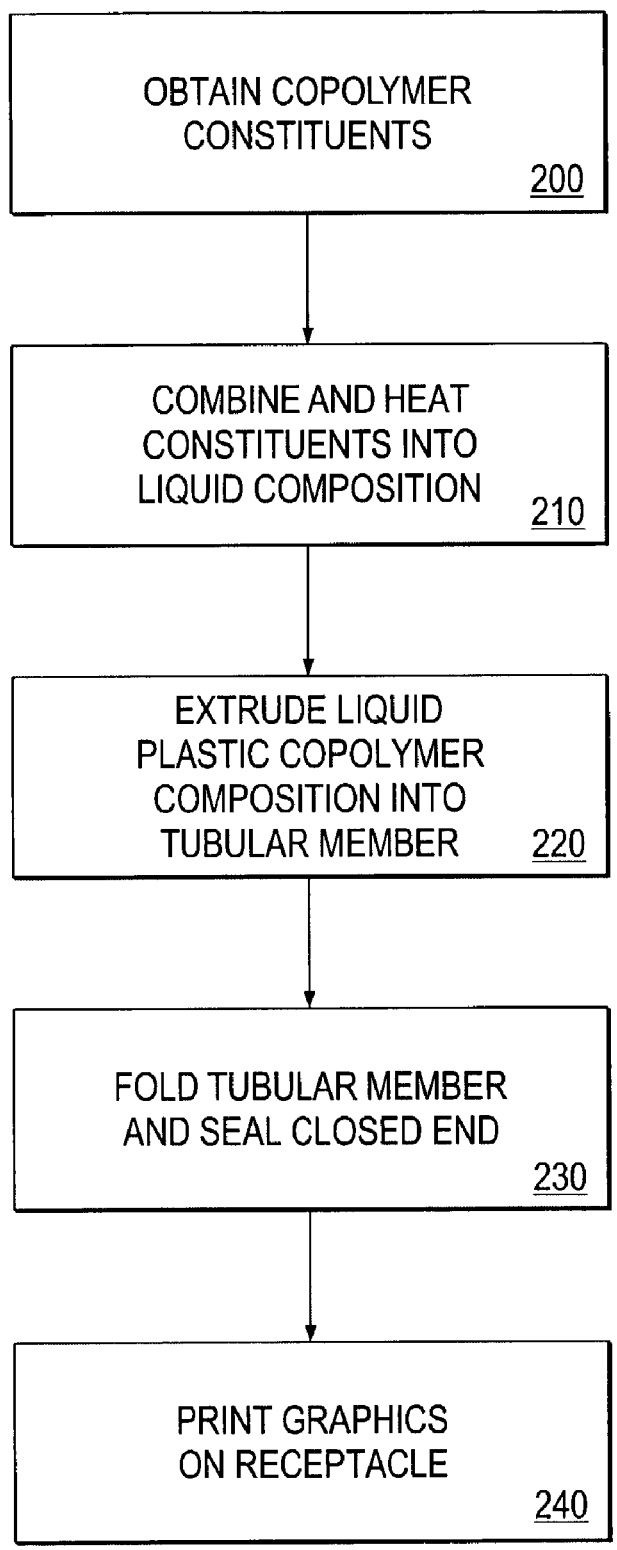
FIG. 3 is a step diagram of the method for making the present invention.

FIG. 3 illustrates the steps for manufacturing a preferred embodiment of the present invention. Step 200 represents the acquisition of the various copolymer constituents used to make the present invention. Upon acquiring the constituents, step 210 corresponds to the mixing and heating of the constituents into a workable composition that can be formed in an extrusion process. The extruding process and cooling step (step 220) follows, where the composition is formed into a tubular member with a seamless, uniform perimeter. In step 230, the tubular member is folded and creased using a sheet folding machine into a rectangular configuration with creases that cause the tubular member to fold into a bag-shaped configuration. In addition, the bottom end of the receptacle is sealed closed using heat or adhesive to form a fluid-tight seal to prevent leakage through the bottom of the receptacle. After the receptacle has been formed and cooled, the final step 240 calls for the printing of various graphics and information, including instruction, on the outside of the receptacle. The final printing step is preferably accomplished with a Gravure process that allows rapid printing of many receptacles.

The description above is illustrative only, and is intended to provide the inventor's best mode of making and using the invention. However, it will be apparent to one of ordinary skill in the art that the present invention can be practiced outside of the present description. Thus, the disclosure should be viewed as illustrative only, with the scope of the invention limited only by the language of the claims presented below.

What is claimed is:

1. A method for making a motion sickness receptacle comprising the steps of:
   providing a copolymer composition of first and second plastics;
   heating said copolymer composition to 200° C.;
   extruding the copolymer composition into a seamless tubular member;
   applying creases in the tubular member to create a rectangular parallelepiped;
   sealing a first end of said tubular member into a fluid-tight relationship by heat-pressing opposed edges of said tubular member;
   providing closure means adjacent a second end of said tubular member; and
   applying graphics to an outer surface of said tubular member, said graphics comprising instructions for using said tubular member in the event of nausea.

* * * * *